(12) United States Patent
Gilmore et al.

(10) Patent No.: US 9,908,794 B2
(45) Date of Patent: Mar. 6, 2018

(54) ELECTROCOAGULATION CHAMBER WITH ATMOSPHERIC AND PRESSURIZED FLOW REGIMES

(71) Applicant: F&T Water Solutions LLC, Largo, FL (US)

(72) Inventors: F. William Gilmore, Venice, FL (US); Ilia Petkov, Colorado Springs, CO (US); Michael Czarniecki, Cascade, CO (US)

(73) Assignee: F&T WATER SOLUTIONS LLC, Largo, FL (US)

( * ) Notice: Subject to any disclaimer, the term of this patent is extended or adjusted under 35 U.S.C. 154(b) by 0 days.

(21) Appl. No.: 14/724,793

(22) Filed: May 28, 2015

(65) Prior Publication Data

US 2015/0353387 A1     Dec. 10, 2015

Related U.S. Application Data

(60) Provisional application No. 62/007,863, filed on Jun. 4, 2014.

(51) Int. Cl.
*C02F 1/463* (2006.01)
*C02F 1/461* (2006.01)

(52) U.S. Cl.
CPC .......... *C02F 1/463* (2013.01); *C02F 1/46104* (2013.01); *C02F 2201/007* (2013.01); *C02F 2201/46105* (2013.01)

(58) Field of Classification Search
CPC ...................................................... C02F 1/463
See application file for complete search history.

(56) References Cited

U.S. PATENT DOCUMENTS

| | | | | |
|---|---|---|---|---|
| 4,329,211 A | * | 5/1982 | Plantes | C02F 1/46114 204/267 |
| 4,728,410 A | * | 3/1988 | Renzler | B01D 17/0205 204/229.6 |
| 6,613,217 B1 | | 9/2003 | Gilmore | |
| 6,866,757 B2 | | 3/2005 | Gilmore | |
| 8,709,222 B2 | | 4/2014 | Gilmore | |
| 2004/0026335 A1 | * | 2/2004 | Fields | C02F 9/00 210/748.11 |
| 2004/0079650 A1 | * | 4/2004 | Morkovsky | C02F 1/463 205/742 |
| 2005/0274606 A1 | * | 12/2005 | Powell | C02F 1/463 204/228.2 |

(Continued)

*Primary Examiner* — Steven A. Friday
(74) *Attorney, Agent, or Firm* — Kyle W. Rost

(57) ABSTRACT

A pressure vessel (28) accumulates an aqueous stream at elevated pressure and feeds it through a pressure retaining array of passages (18) in the bottom wall of a modular reaction chamber (14) that operates at atmospheric pressure. Spaced electrodes (16) treat the stream during upward flow to the open top of the chamber, where the treated stream overflows the chamber and falls into an inter-wall volume between the chamber and an outside housing (12), washing foam from the housing and chamber as it exits. A housing cover (54) establishes headspace over the chamber to accommodate the overflow. The entire chamber (14) is removable from the housing (12) by loosening fasteners (39) in the bottom wall (20) and lifting it free, with no impediment due to clogging or corrosion outside the chamber.

5 Claims, 4 Drawing Sheets

(56) References Cited

U.S. PATENT DOCUMENTS

| | | | | |
|---|---|---|---|---|
| 2010/0140180 | A1* | 6/2010 | Powell | C02F 9/00 210/710 |
| 2010/0307984 | A1* | 12/2010 | Mortensen | C02F 1/463 210/704 |
| 2011/0100839 | A1* | 5/2011 | Prokop | C02F 1/463 205/743 |
| 2011/0155564 | A1* | 6/2011 | Oifman | B01D 21/0003 204/230.2 |
| 2011/0290667 | A1* | 12/2011 | Kaspar | C02F 1/463 205/742 |
| 2012/0138482 | A1* | 6/2012 | Fanfan | C02F 1/463 205/756 |
| 2013/0112571 | A1* | 5/2013 | Doi | C02F 1/4674 205/498 |
| 2014/0311920 | A1* | 10/2014 | Robinson | C02F 1/46104 205/743 |

* cited by examiner

ELECTROCOAGULATION CHAMBER WITH ATMOSPHERIC AND PRESSURIZED FLOW REGIMES

BACKGROUND OF THE INVENTION

Field of the Invention

The invention generally relates to electrolysis and to processes, compositions used therein, and method of preparing the compositions. More specifically, the invention relates to product, process, and electrolyte composition for electrolytic material treatment, where the material is water, sewage, or other waste water. In another aspect, the invention generally relates to the chemistry of electrical and wave energy. More specifically, the invention relates to electrolytic apparatus and to cells with electrolyte treatment means.

Description of Related Art

Electrocoagulation is a process of electrical destabilization of particles in water and is used to treat water to remove impurities. This process changes the surface charge of suspended particles, which allows suspended matter to form an agglomeration. Electrocoagulation is known to require no filters, no daily maintenance, and no additives. It is capable of removing any size of suspended solids, oil, grease and heavy metals.

Electrocoagulation employs processing chambers that may contain one or more electrolytic cells. A housing typically defines a single chamber and contains one or more cells. Where a chamber is formed of multiple cells, each cell performs electrolysis according to its own characteristics. A single cell is formed of at least two electrodes in contact with an electrolyte solution. The electrodes are made of metal or carbon. An electrical charge is applied across a pair of electrode plates to cause a flow of ions within the electrolyte solution, resulting in redox reactions at the electrodes. According to conventional terminology, one electrode of an electrode pair is an anode, where oxidation occurs. The second electrode of the electrode pair is a cathode, where reduction occurs. In an electrolytic cell, the anode is positively charged and the cathode is negatively charged. The oppositely charged plates produce ions that move in the electrolyte. Positive ions move toward the negative electrode and negative ions move toward the positive electrode.

An electrolytic cell is useful to decompose compounds in the electrolyte using electrical energy. For example, water in the electrolyte can be decomposed into hydrogen gas and oxygen gas. The practice of electrolysis upon aqueous solution containing other compounds can result in production of water plus an agglomerate. The latter can be separated from the water to produce residual clean water. This process and its chemistry are well known, and many types of apparatus are used in the practice of it.

While electrolysis is highly effective in producing clean water, attempts to operate an electrolytic cell on a continuous, long term basis with a complex or variable electrolyte stream have encountered maintenance and operational difficulties. One of these limitations is with current flow paths. In an idealized, text book model of a cell, oppositely charged plates face each other across a gap filled with water, and the major facing surfaces of the plates generate ions or other charged particles in the water. In practice, plate wear can be much more accelerated than suggested by the model cell. Electrical current tends to travel along selected pathways of least resistance and often concentrates at specific areas of an electrode, such as the edges of the electrode. Concentrated current flow is undesirable because it quickly erodes the areas where it travels. Current can cut channels through a plate, erode away a plate from one edge, and even cut off a connection tab that is supplying power to the plate. In some chambers, the plates have been selectively eroded to the point of premature collapse. These problems result in interruption of water treatment and may require extensive and frequent maintenance of the electrocoagulation chamber.

Electrocoagulation is effective for removing heavy metals, suspended solids, emulsified organics and many other contaminants from water. The contaminants are combined in a waste stream that produces floc, which is mainly insoluble oxides and hydroxides. A floc stream tends to settle for easy separation from the clear water.

It would be desirable for an electrocoagulation chamber to be quickly and easily serviced when maintenance is needed. An aspect of maintenance is the ability to quickly and easily reconfigure a cell to meet new operational requirements. Thus, an object of the invention is to simplify cell reconstruction and reconfiguration by use of a modular cell design.

Rebuilding a typical chamber involves the cost of new plates in addition to loss of use of the chamber during down-time. Electrode plates often are arranged within a housing by use of a spacer, which can be a slotted edge guide. The slots receive the plates, while intermediate portions of the guide between slots serve as spacers that establish a predetermined gap between plates. Typically, two guides establish the plate spacing parameters of the cell, with the two guides arranged on opposite sides of the plates or on top and bottom of the plates. Repairing almost any problem with a typical cell requires at least partial disassembly of the chamber.

Changing operational characteristics of a typical cell also requires at least partial disassembly of the chamber. For example, when treating certain electrolytes in a typical chamber, it may be necessary to change the plate gap that is currently established in a chamber. Typically, a change of plate gap is accomplished by switching the slotted guide for another with a more suitable intermediate dimension between slots. In addition, the accompanying loss of service time due to disassembly of a cell for any reason is undesirable.

Rebuilding or reconfiguring a cell often is a difficult process. Simply stating that there is a requirement to change a plate or change a guide is deceptively simple. In practice, a cell needing maintenance can be so clogged or corroded that removing a single plate or removing a single guide is ponderous work. Such simply stated tasks may require hours of hard work with the help of heavy duty shop equipment. Hence, references to lost time and down time are serious matters and not to be taken lightly.

It would be desirable for an electrolytic chamber to be rapidly serviceable, even when disassembly or replacement is required.

Further, it would be desirable for an electrocoagulation cell to be constructed in such a manner that clogging and corrosion are minimized.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide an electrocoagulation chamber formed of a housing that contains a modular or removable reaction chamber. The component reaction chamber is configured to support a plurality of electrode plates at preselected mutual spacing and oriented in a vertical position within the reaction chamber. A manifold grid or array of inlet openings is formed in a bottom, manifold wall of the reaction chamber. The array is configured to place the openings, or at least a preselected portion of such openings, to communicate with the spacing between electrode plates, such that a liquid feed stream passing upwardly through the openings is fed into the spacing between the electrode plates. Preferably the number and position of the inlet openings feeding each spacing is substantially identical so as to create a uniform feed between each spaced pair of plates. In any event, the manifold array establishes a flow of liquid into the reaction chamber via the spaces between the electrodes.

The reaction chamber forms an outlet for discharging the treated liquid feed stream. The outlet may be an open top of the reaction chamber, where the treated feed stream is allowed to overflow the side walls of the reaction chamber. The housing may be taller and wider than the reaction chamber, such that the overflowing feed stream falls into or within the housing. The electrode plates may have a functional height of about the height of the reaction chamber so that the feed stream is treated for substantially the entire height of the reaction chamber. A portion of each electrode plate may extend above the top of the reaction chamber. These extending portions may be ears or tabs that provide a dry electrical connection point for applying selected polarity to each plate.

The housing and modular reaction chamber engage one another to establish two modes of operation for processing the liquid feed stream. In the first mode of operation, upstream of the manifold, the feed stream is handled under pressure. As a portion of the housing, or as a separate chamber located below the housing, a pressure vessel receives the feed stream below the reaction chamber. The pressure vessel defines an inlet for receiving the feed stream under pressure. Thus, the inlet may be deemed to be relatively small and is sized for connection to a conduit from a pump or other source of pressurized liquid. Conveniently, the inlet may be located on the bottom wall of the pressure vessel. A top wall of the pressure vessel defines an outlet window. The dimensions of this outlet window are similar to the dimensions of the manifold grid or array of inlet openings on the bottom or manifold wall of the reaction chamber. As compared to the relatively small inlet to the pressure vessel, the outlet window is relatively large. The term, "window" refers to a large opening. This window is juxtaposed to the manifold wall of the reaction chamber, where the array of inlet openings to the reaction chamber limits flow from the pressure vessel to the reaction chamber. In one possible configuration, the top wall of the pressure vessel extends centrally from the periphery of the pressure vessel to a position underlying side walls of the reaction chamber, and then defines a central outlet window beginning inside the side walls of the reaction chamber. This suggested configuration allows the pressure vessel to support the reaction chamber while leaving open the large central window for transmitting the pressurized feed stream into the reaction chamber through the array of inlet openings, which overlie the outlet window.

In the second mode of operation, the feed stream enters the reaction chamber at atmospheric pressure through the manifold array of inlet openings. In the reaction chamber, the feed stream is treated at atmospheric pressure. The feed stream rises in the reaction chamber until reaching the top where the treated stream overflows the top edge of reaction chamber. In this mode of processing, the relationship between the reaction chamber and the housing is controlling. The housing is wider and taller than the reaction chamber. The reaction chamber fits into the housing in a predefined position where there is spacing between the respective sidewalls of the two components, creating an inter-wall volume between the sidewalls of the reaction chamber and housing. This spacing allows the treated feed stream to be removed from the housing without leaving behind any substantial trapped liquid in the inter-wall volume. In a preferred arrangement, the housing is cylindrical and has a predefined transverse diameter. The reaction chamber is a rectangular box or rectangular cuboid, where transverse diagonals between corners are shorter than the predefined transverse diameter of the housing cylinder. The reaction chamber may fit symmetrically into the housing at a preselected position, such that no side wall of the reaction chamber is in contact with a side wall of the housing.

The housing carries a discharge means, such as a chute that feeds the overflowed liquid feed stream from the inter-wall volume to an external facility such as a settling pond or tank. The chute is located at the bottom level of the housing, at approximately the same level as the bottom wall of the reaction chamber. Liquid from the overflowed feed stream is able to drain from all sides of the reaction chamber through the chute. This drainage is desirable because electrocoagulation produces a top foam. The upflowing liquid in atmospheric processing washes the foam out of the reaction chamber and into the inter-wall volume. That liquid, including top foam, exits the housing through the chute.

The reaction chamber is configured to ensure symmetrical or centered fit within the housing. One suitable configuration is for the bottom, manifold wall of the reaction chamber to closely fit the inside transverse shape of the housing, inside the side walls. When the housing is cylindrical, this is achieved by configuring the bottom wall of the reaction chamber to be a disk with diameter approximately equal to the inside diameter of a cylindrical housing. This bottom wall is mounted to the side walls of the reaction chamber to carry the side walls where desired, which typically is in a centered relationship. Likewise, the array of manifold holes in the bottom wall is formed with respect to the mounting of the side walls, which in turn locates the electrode plates and interplate spacings.

In a modified version of the described bottom wall, one edge of the bottom wall is cut straight, outside and parallel to a side wall of the reaction chamber. This straight edge is in a position corresponding to the mounting location of the exit chute in the housing. Thus, the exit chute is mounted at an opening in the side wall of the housing, with a support base extending into the housing and fitting against the straight edge of the reaction chamber's bottom wall. This fit between the base of the chute and the bottom wall of the reaction chamber establishes a transition area for guiding treated liquid out of the housing. The base of the exit chute may be thinner than the bottom wall of the reaction chamber, establishing a downward step at the start of the chute to help feed liquids from the inter-wall volume out of the chute. Together, the housing, chute, and reaction chamber form a coordinated structure that ensures full drainage of overflow liquid.

The reaction chamber is coordinated in size with the housing. Similarly sized reaction chambers can be exchanged in the same housing, and limited differences in the configuration of similarly sized reaction chambers allow a certain amount of variation in processing performance while maintaining the same housing. As described, the reaction chamber is formed of a bottom, manifold wall, and a rectangular box structure that defines four side walls. An opposite pair of the side walls is configured to support electrode plates of a preselected thickness at a preselected interplate spacing, forming a series of plates that is a full set for the reaction chamber. These supporting side walls may be grooved in a coordinated pattern to establish vertical reception slots that each receive and support an electrode plate. Ungrooved lengths between the grooves establish an interplate spacing. The first and last plates in the series are located against the opposite side walls, which are non-supporting side walls, and which are normal to the supporting side walls. The manifold apertures in the bottom wall lie generally in alignment with the ungrooved lengths. Typical configurations for a reaction chamber that processes ten gallons per minute are ten electrode plates with three-eighths inch spacing or eleven electrode plates with one-quarter inch spacing.

Each electrode plate is configured with a lower portion or processing portion to treat the liquid feed stream and that fits within said reaction chamber. Each electrode plate also is configured with an upper or superstructure portion that remains above the reaction chamber and is adapted for possible attachment to a polarizing source. The superstructure portion is an upstanding ear or tab that is a narrow extension of the lower portion of the electrode plate and is located near one edge of the electrode plate. The housing is fitted with a top cover that contains the treated water from overflowing the top of the housing while permitting passage of the tab through the cover. The cover is slotted in positions and number that align with the tabs, according to the position and number of plates in the reaction chamber. As an example, with ten electrode plates, the plates in successive slots would have tabs located at opposite sides of the reaction chamber. Only one design of electrode plate is necessary because any plate can be turned to vary the relative side edge where the tab lies. With the single design, each successive plate is reversed so that the tabs in each pair of consecutive slots are at opposite lateral sides of the reaction chamber. Accordingly, the cover would have aligned slots that are coordinated with the alternating side alignments of the successive plates. With ten plates in a single reaction chamber, the cover would have two columns of five slots each. The slots in each column are staggered with respect to slots in the other column, to match the staggered positions of the tabs. A seal such as an o-ring is applied to each tab at a suitable height to seal against a slot, thus making the top cover water-tight when attached to the top of the housing.

The dry exterior of the cover is a convenient location for attaching polar leads. A pair of oppositely polarized mounting bars is attached to the cover in spaced apart locations. The mounting bars may be located near opposite side edges of the cover. For example, a mounting bar may be located near each column of slots, outside the position of the column of slots. This positioning of the mounting bars conveniently places a different polarity in proximity to the tabs in each column of slots. Both the mounting bars and the tabs are configured to accept jumper wires at attachment holes. Jumper wires may be used to connect each mounting bar to each tab that is to carry the same polarity. Jumper wires from each mounting bar are conveniently used to connect to the juxtaposed column of tabs. This arrangement is flexible and allows selected plates to not be directly polarized, if desired. Likewise, it is a simple matter to extend a jumper wire to a tab in the opposite column, if desired, or to otherwise create novel patterns of polarized electrodes.

To allow direct viewing of chamber performance, the housing or top cover may have viewing windows installed. As an example, the top cover has adequate room for a viewing window in a central position, between the two columns of slots. A viewing window is helpful to monitor foam removal, plate wear, and other dynamic conditions that might develop during operation of a cell.

The housing and cell are assembled to allow ready disassembly, when needed. The housing, cover, and pressure vessel are assembled on vertical rods located outside the housing, in dry locations. To remove a reaction chamber, the cover is removed by removing top fasteners from the vertical rods. The reaction chamber is removed from within the electrocoagulation chamber by loosening fasteners that secure the manifold wall and into the top wall of the pressure vessel. These fasteners are located in the inter-wall volume and outside the plate area of the reaction chamber. In this inter-wall position, these fasteners are not prone to corrosion. The reaction chamber then can be lifted from the housing. Because the entire reaction chamber is removed as a unit, clogging or corrosion within the chamber does not slow down maintenance. A new reaction chamber, with new manifold and new plates, can be set into the housing to resume service. Where the new chamber is configured the same as the old chamber, the old top can be reused, if desired. If the new reaction chamber is configured differently from the old one, it will be originally equipped with a manifold of coordinated design, and a new top is applied with slots matching the new positions of the plate ears.

According to a method of the invention, a liquid feed stream is treated by electrocoagulation. First, the feed stream is pressurized above ambient levels and accumulated in a pressure vessel. Second, the liquid feed stream of the pressure vessel is continuously fed through a matrix of pressure limiting openings into a reaction chamber at atmospheric pressure, wherein the reaction chamber contains a vertically oriented array of spaced apart electrode plates, and the matrix of openings is arranged to feed the incoming liquid stream into vertically oriented interplate spaces. Third, the array of electrode plates electrolytically treats the liquid stream in the interplate spaces while the continuously fed liquid stream elevates the treated liquid to the top of the reaction chamber. Fourth, elevated liquid of the feed stream together with any product foam is further elevated to overflow the top of the reaction chamber and fall into a collection area outside the reaction chamber.

According to a further aspect of the invention, the matrix of pressure limiting openings is configured by sizes and positions to provide uniform upward flows in the reaction chamber.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

Figure 1:
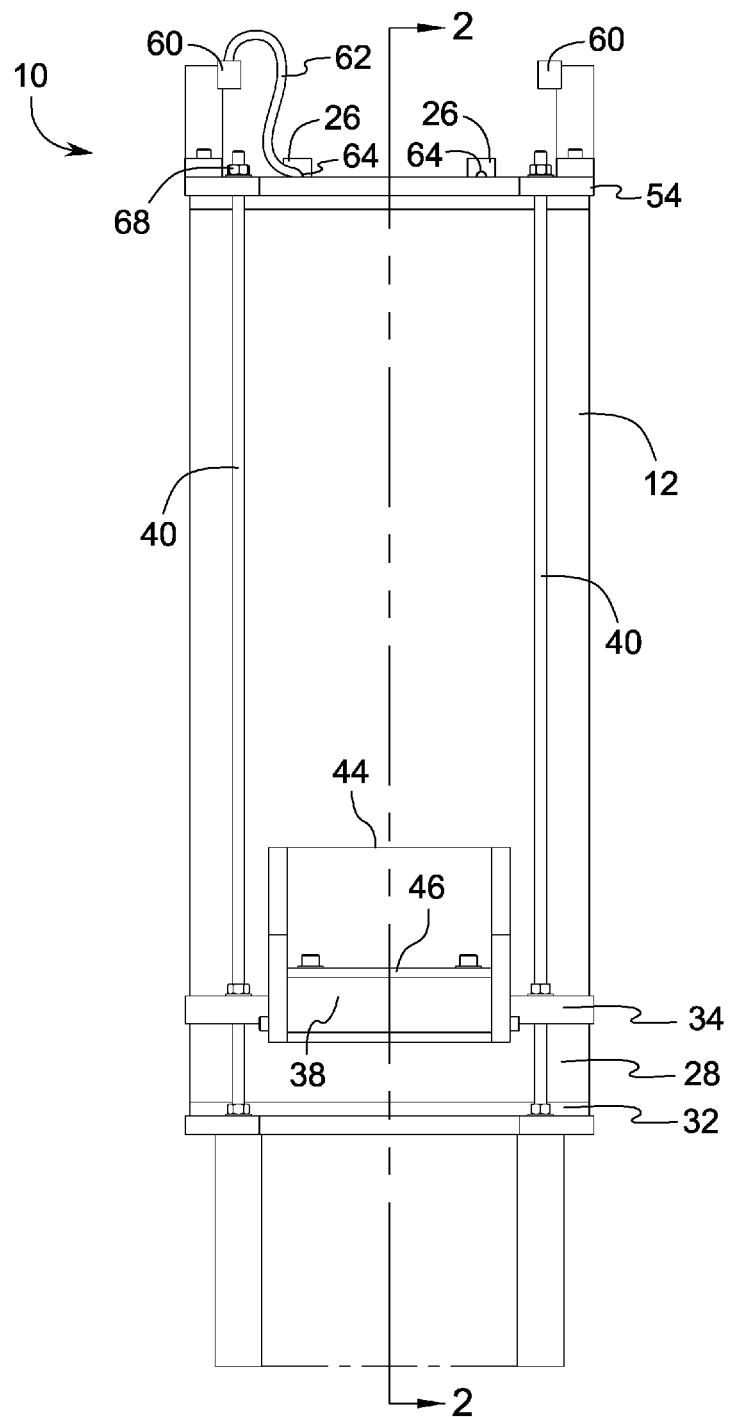
FIG. 1 is a front elevational view of the housing of the electrocoagulation chamber.

With reference to the drawings, the invention is an electrocoagulation chamber 10 that is adapted for treating an influent liquid stream moving substantially vertically from bottom to top. The chamber 10 is formed of a housing 12 that contains a modular or removable reaction chamber 14. The reaction chamber 14 contains a set of electrode plates 16. In this context, a set of electrode plates is those that occupy predetermined available spots or slots in the reaction chamber, with no requirement that the individual plates match one another, although typically a set of plates will be a set of identical plates. The reaction chamber is configured to carry the electrode plates 16 in predetermined positions, at a preselected interplate spacing, and in substantially vertical orientation. The plates may be vertically elongated in order to provide an elongated, vertical processing pathway within the reaction chamber 14.

A means for infeeding a liquid stream to the reaction chamber is located at the bottom of the reaction chamber 14. The infeed means may be a grid, array or matrix of nozzles or net openings 18 acting as a manifold. Suitably, these net openings 18 may be formed in a manifold wall positioned at the open bottom of the reaction chamber. For convenience, accuracy, and modularity, the manifold wall may be attached as a bottom wall 20 of the reaction chamber 14 by suitable fasteners 41. The manifold wall is positioned with respect to the reaction chamber to place the array of net openings 18, or at least a preselected portion of such openings, where they are aligned to communicate with the interplate spacings 22 of a set of plates, such that the liquid feed stream passing upwardly through the openings 18 is fed into the interplate spacings. Preferably the number and position of plural net openings feeding each spacing is substantially identical so as to create a feed of similar or uniform volume between each spaced pair of plates 16. In any event, the array of openings establishes a flow of liquid into the reaction chamber via the interplate spaces 22. The combination of coordinated positions of the electrode plates, the interplate spacings, the manifold wall, and the array of net openings in the manifold wall establishes the modular characteristics of the reaction chamber, such that a reaction chamber 14 is readily removed and replaced with another in the housing 12. For example, reaction chambers 14 can be replaced or substituted for one another within the same housing 12 even when the replacement has a different number of plates or different spacing between plates.

The reaction chamber 14 defines an outlet for discharging the treated liquid feed stream. The outlet may be an open top 24 of the reaction chamber 14, where the treated feed stream is allowed to overflow the sides of the reaction chamber 14. This means for discharge requires no significant attachment to other structures of chamber 10, further contributing to the ease and speed of replacing a reaction chamber. The housing 12 may be taller and wider than the reaction chamber 14, such that the overflowing feed stream falls into the housing 12. The electrode plates 16 may have a functional height of about the height of the reaction chamber 14 so that the feed stream is treated for substantially the entire height of the reaction chamber 14. A portion of each electrode plate 16 may extend above the open top 24 of the reaction chamber 14. These extending portions may be ears or tabs 26 that provide a dry electrical connection point for applying selected polarity to each plate 16.

The housing 12 and modular reaction chamber 14 engage one another to establish two modes of operation for processing the liquid feed stream. In the first mode of operation, the feed stream is maintained under elevated pressure. As a portion of the housing, or as a separate chamber located below the housing, a pressure vessel 28 located below the reaction chamber 14 receives the feed stream. The pressure vessel defines an net 30 for receiving the feed stream under pressure. Thus, the net 30 may be relatively small and is sized for connection to a conduit from a pump or other source of pressurized liquid. Conveniently, the net 30 may be located on the bottom wall 32 of the pressure vessel 28. A top wall 34 of the pressure vessel 28 defines a relatively large outlet window 36. The dimensions of this outlet window 36 are similar to the dimensions of the portion of bottom wall 20 carrying the grid or array of net openings 18 at the bottom of the reaction chamber 14. By comparison, the net 30 is relatively smaller, while the outlet window 36 is relatively larger. The term, "window" refers to a large opening. This window 36 is juxtaposed to the bottom wall 20 of the reaction chamber 14 and aligned with the grid or array of net openings 18 to the reaction chamber, which limit flow from the pressure vessel 28 to the reaction chamber 14. In one possible configuration, the top wall 34 of the pressure vessel extends centrally from the periphery of the pressure vessel 28 to a position underlying side walls of the reaction chamber, and then defines a central outlet window from the side walls of the reaction chamber 14. This suggested configuration allows the pressure vessel 28 to support the reaction chamber 14 while leaving open the large central window 36 for transmitting the pressurized feed stream into the reaction chamber through the array of net openings 18, which overlie the outlet window 36.

In the second mode of operation, the feed stream enters the reaction chamber 14 through the array of net openings 18 and thereafter is treated at atmospheric pressure. Passage through the many openings 18, as the stream transitions from higher pressure to atmospheric pressure, establishes turbulent flow between the plates 16, which is favorable for processing the stream. In the reaction chamber 14, the feed stream is treated at atmospheric pressure. The feed stream rises in the reaction chamber 14 until reaching the top where the treated stream overflows the top edge 24 of reaction chamber 14. In this mode of processing, the relationship between the reaction chamber 14 and the housing 12 is controlling. The housing 12 is wider and taller than the reaction chamber 14. The reaction chamber fits into the housing 12 in a predefined position where there is spacing between the respective sidewalls of the two components, creating an inter-wall volume 37. This spacing allows the treated feed stream to be removed from the housing 12 without leaving behind any substantial volume of trapped liquid in the inter-wall volume 37. In a preferred arrangement, the housing 12 is shaped as an upright cylindrical and has a predefined transverse diameter. The reaction chamber 14 is shaped as a rectangular box or rectangular cuboid formed of a side closure, such as four side walls 48, 52 meeting at right angles. Transverse diagonals between corners are shorter than the predefined transverse diameter of the cylindrical housing sidewall. The reaction chamber 14 may fit symmetrically into the housing 12 in a preselected position, such that no side wall of the reaction chamber 14 is in contact with the side wall of the housing 12.

The housing carries a discharge means, such as a conduit or an exit chute 38 that feeds the overflowed liquid feed stream from the inter-wall volume 37 to an external facility such as a settling pond or tank. The chute 38 is located at the bottom level of the housing 12, at approximately the same level as the bottom wall 20 of the reaction chamber. Liquid from the overflowed feed stream is able to drain from all sides of the reaction chamber 14 through the chute 38. This drainage is desirable because electrocoagulation typically produces a top foam, which in a pressurized cell tends to remain in the cell and reduce available volume for processing the liquid stream. The upflowing liquid in atmospheric processing chamber 14 washes the foam out of the chamber and into the inter-wall volume 37. That liquid, including top foam, exits the housing 12 through the chute 38.

The reaction chamber 14 is configured to ensure a symmetrical or centered fit with respect to the cylindrical wall of housing 12. A guide or spacer operates between the reaction chamber 14 and housing 12 to establish relative positioning. One suitable configuration is for the manifold wall 20 to be attached by fasteners 41 as the bottom wall of the reaction chamber 14 and to closely fit the inside transverse shape of the cylindrical housing side wall 12, thereby establishing a predetermined position for the reaction chamber 14 inside the housing 12. The a guide or spacer may be regarded as being a means for laterally aligning the side enclosure of the reaction chamber in a predetermined central position within the housing. The manifold wall 20 is wider than the walls of reaction chamber 14 and provides a laterally wider peripheral wall portion that extends between the reaction chamber walls and the housing wall. The peripheral wall portion is fastened to the top of the pressure vessel by fasteners 39. These fasteners are readily reached through the inter-wall volume by normal tools for installing or removing a reaction chamber 14. Reaction chambers 14 are readily removed and replaced for maintenance or for a change in performance, due to guidance by a guide wall 20, which results in the replacement chamber precisely fitting into the proper, predetermined position.

When the housing 12 is cylindrical, the predetermined fit is achieved by configuring the bottom, manifold wall 20 of the reaction chamber 14 as a disk with diameter approximately equal to the inside diameter of a cylindrical housing 12. The diameter of the disk-shaped portion of wall 20 is wider than the side walls of the reaction chamber 14. Fastening bolts 39 can fix manifold wall 20 in preselected position with respect to top wall 34 of pressure vessel 28 to carry the side walls 48, 52 of the reaction chamber 14 in a desired position, which typically is in a centered relationship within housing 12. External vertical alignment rods 40 further ensure that the housing and pressure vessel maintain theft alignment with respect to manifold plate 20. Likewise, the array of manifold holes 18 in the manifold wall 20 is formed to coordinate with the interplate spacings 22. The mounting position of the reaction chamber's side walls on the manifold wall 20 locates the electrode plates 16 and locates the interplate spacings 22. In a single modular reaction chamber 14, the use of an integral manifold wall 20 ensures that the manifold holes 18 are suitably located to feed into the interplate spacings 22.

Figure 2:
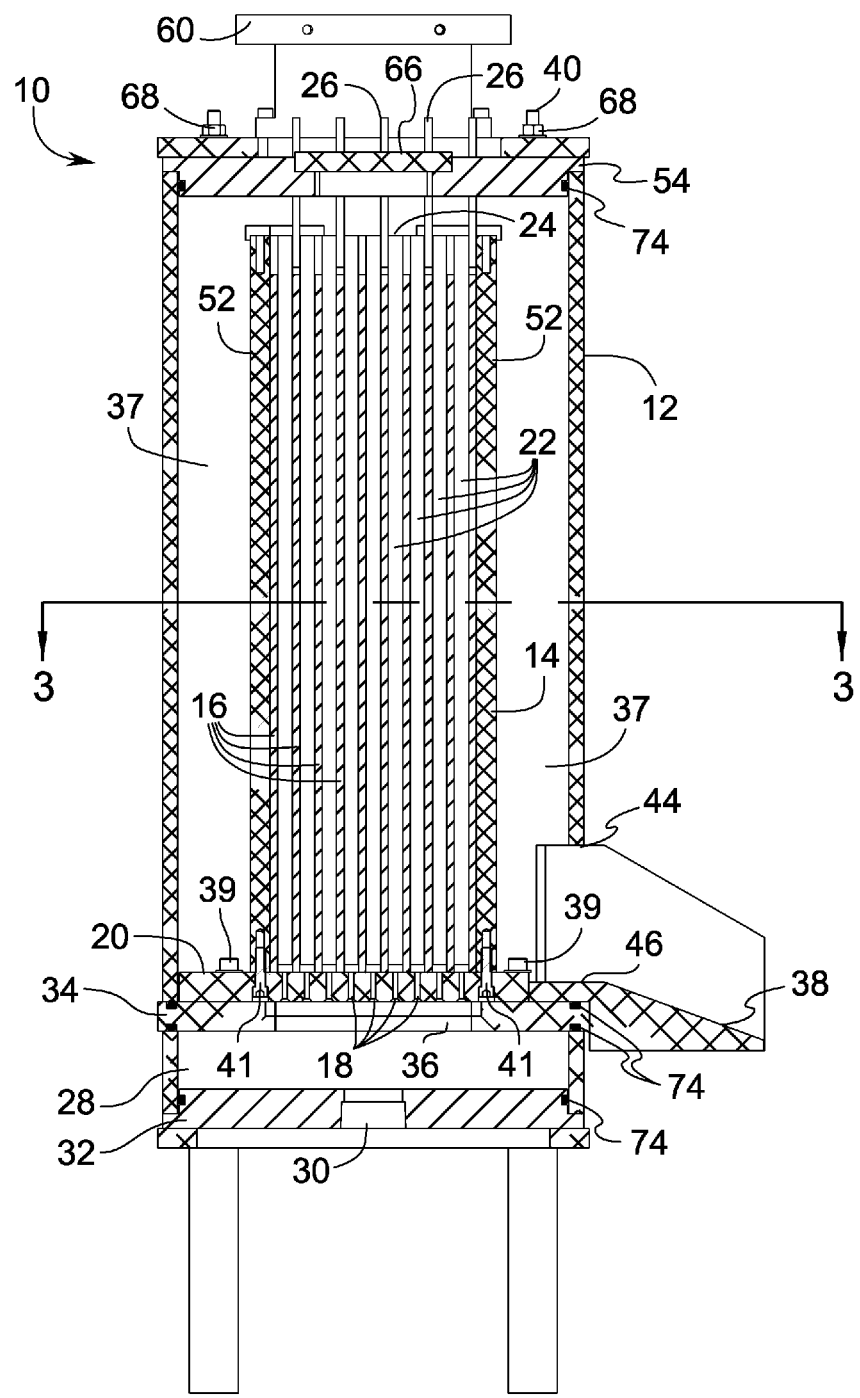
FIG. 2 is a vertical cross-sectional view of the electrocoagulation chamber taken on the plane through line 2-2 of FIG. 1.
Figure 3:
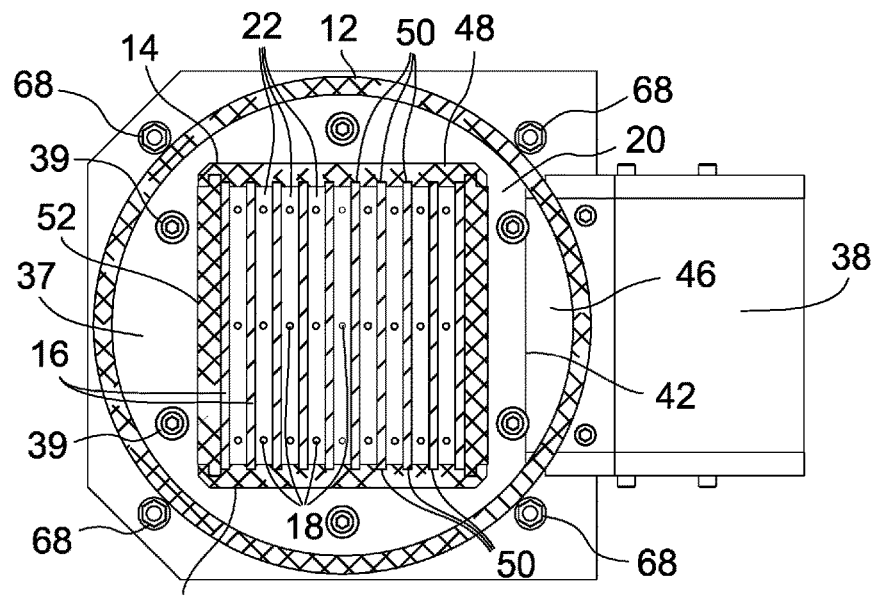
FIG. 3 is a horizontal cross-sectional view of the electrocoagulation chamber, taken on the plane of line 3-3 of FIG. 2.

With reference to FIG. 3, in a modified version of the described manifold 20, one edge 42 of the bottom wall 20 is cut straight, at a position that will be outside and parallel to a side wall 48, 52 of the reaction chamber. This straight edge 42 is in a position corresponding to the mounting location of the exit chute 38 in the housing 12. Thus, the exit chute 38 is mounted at an opening 44 (FIGS. 1 & 2) in the side wall of the housing 12, with a support base 46 extending into the housing 12 and fitting against the straight edge 42 of the reaction chamber's bottom wall 20. This fit between base 46 of the chute 38 and the bottom wall 20 of the reaction chamber 14 establishes a transition area for guiding treated liquid out of the housing. The base 46 of the exit chute 38 may be thinner than the bottom wall 20 of the reaction chamber 14, establishing a downward step at the start of the chute 38 to help feed liquids from the inter-wall volume 37 out of the chute 38. Together, the housing, chute, and reaction chamber form a coordinated exit structure that ensures full drainage of overflow liquid, including any foam.

The reaction chamber 14 is coordinated in size with the housing 12. Similarly sized reaction chambers 14, together with any coordinating top cover that is needed, can be exchanged in the same housing 12, and limited differences in the configuration of similarly sized reaction chambers 14 allow a certain amount of variation in processing performance while maintaining the same housing 12. As described, the reaction chamber 14 is formed of a bottom wall or manifold wall 20 and a rectangular box structure that defines four side walls 48, 52. An opposite pair of the side walls 48 may be referred to as plate supporting walls. These are configured to support electrode plates 16 of a preselected thickness at a preselected interplate spacing 22, forming a series of plates that is a full set for the reaction chamber 14. These plate supporting side walls 48 form vertical grooves 50 on theft inside faces in a coordinated pattern to receive plates between opposed grooves at fixed positions. Other portions of side walls 48 may be referred to as ungrooved lengths but simply are areas between the plate carrying grooves 50 that establish the interplate spacing 22. The first and last plates in a set are located against opposite side walls 52 that are not plate supporting walls. These walls 52 are normal to the plate supporting side walls 48. The apertures 18 in the bottom wall 20 lie generally between opposite ungrooved portions of walls 48. Typical configurations for a reaction chamber 14 that processes ten gallons per minute are ten electrode plates with three-eighths inch (9.53 mm) spacing or eleven electrode plates with one-quarter inch (6.35 mm) spacing.

Figure 4:
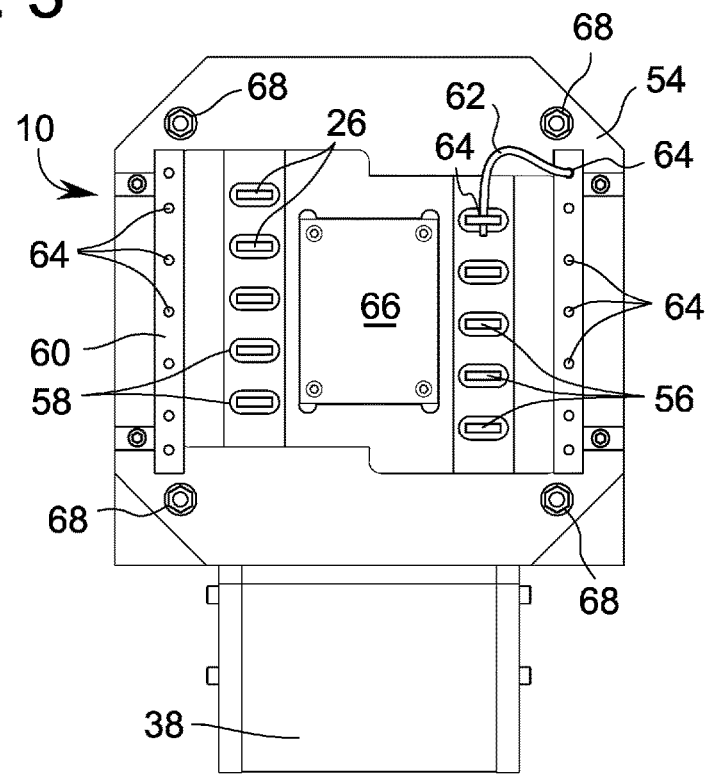
FIG. 4 is a top plan view of the electrocoagulation chamber showing the lid.
Figure 5:
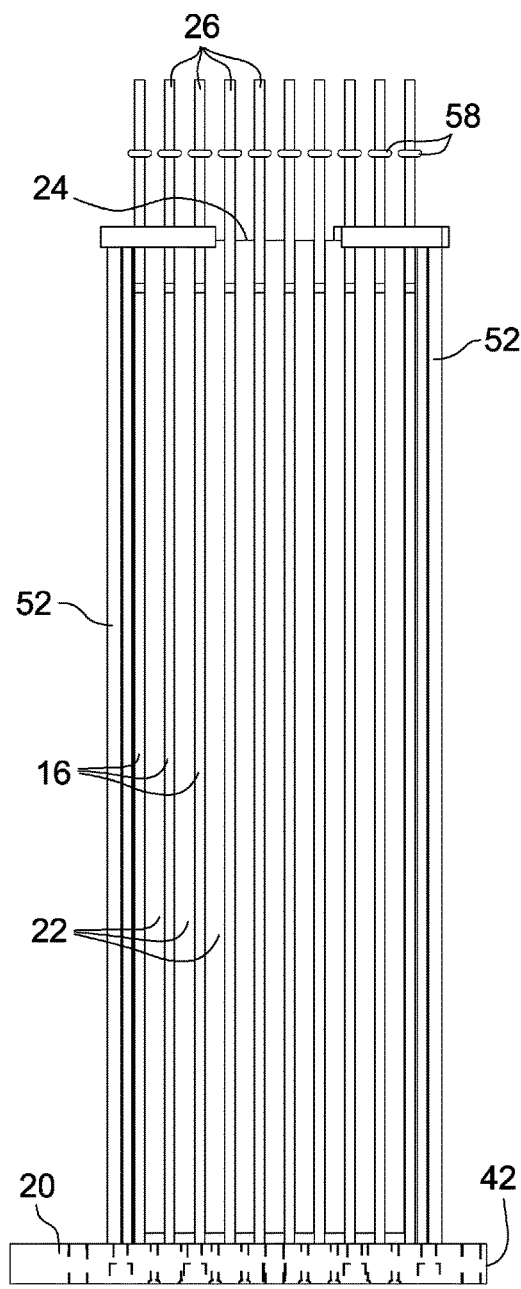
FIG. 5 is a side elevational view of a reaction chamber with near side removed to show a set of electrodes therein, with inlet openings and fastener openings in the manifold plate shown in phantom.
Figure 6:
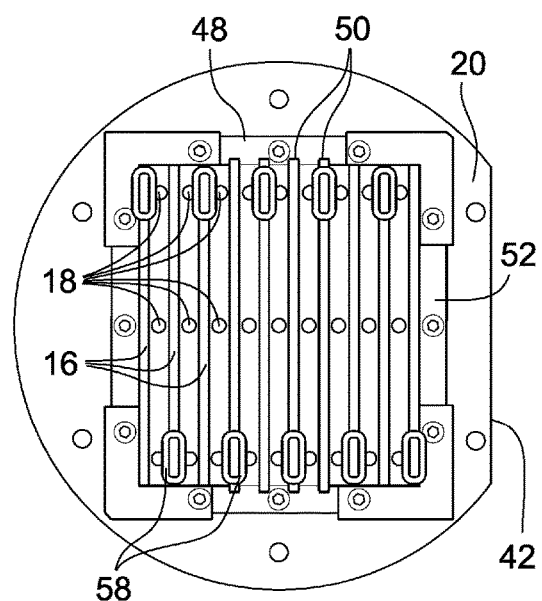
FIG. 6 is a top plan view of a reaction chamber fitted with a set of electrode plates therein.

As best seen in FIGS. 4-6, each electrode plate 16 in a set is substantially identical in shape, with a lower portion sized to fit in the reaction chamber to treat the feed stream and with an upper or superstructure portion that remains above the reaction chamber and is configured for possible attachment to a polarizing source. A suitable superstructure configuration is an upstanding tab 26 that is a upward extension of the processing portion of the electrode plate with a width that is less than the processing portion of a plate 16. The housing 12 is fitted with a watertight top cover 54 that contains the treated water from overflowing the top of the housing 12 while still permitting passage of the tabs 26 through the cover. The cover defines a suitable number of slots 56 in positions that align with the tabs 26 of plates 16 in the reaction chamber 14. The configuration of the cover 54 and reaction chamber 14 are coordinated. As an example using a set of ten electrode plates, the plates 16 in successive grooves 50 would have tabs positioned near opposite sides of the reaction chamber 14. A single design of electrode plate 16 can provide a tab at either edge of the plate because any plate can be turned to reverse the relative side edge where the tab lies. With the single design for plates 16, each successive plate is reversed so that the tabs in each pair of consecutive grooves are at opposite lateral sides of the reaction chamber. Accordingly, the cover 54 has aligned slots 56 that are coordinated with the alternating tab positions of the successive plates in the set. With ten plates in a single reaction chamber, the cover defines two columns of five slots each. The slots 56 in each column are staggered with respect to the slots 56 of the other column, thereby matching the staggered positions of the tabs 26. A seal such as an o-ring 58 is applied to each tab 26 at a suitable height to establish a tight seal against a slot 56, making the top cover 54 water-tight when attached to the top of the housing 12.

The dry exterior of the cover 54 is a convenient location for attaching polar leads. A pair of mounting bars 60 is attached to the cover 54 in spaced apart locations near opposite edges of the cover 54. For example, a mounting bar 60 may be located near each column of slots 56, outside the position of the column of slots. The mounting bars are insulated from one another and each carries an opposite charge, such as by connection the an external power supply. This positioning of the mounting bars 60 conveniently places a source of different polarity in proximity to the tabs 26 in each column of slots. Both the mounting bars and the tabs are configured to be selectively, temporarily interconnected to power any tab with any selected polarity. For example, the interconnection may be by jumper wires 62 connected between a mounting bar and a tab at any selected pair of attachment holes 64. Jumper wires 62 may be used to connect each mounting bar 60 to each tab 26 that is to carry the same polarity. Jumper wires 62 from each mounting bar 60 are conveniently used to connect to the juxtaposed column of tabs. This arrangement is flexible and allows selected plates 16 to not be directly polarized, if desired. Likewise, it is a simple matter to extend a jumper wire 62 to a tab in the opposite column or otherwise create novel patterns of polarized electrodes.

To allow direct viewing of chamber performance, the housing 12 or top cover 54 may have viewing windows 66 installed. As an example, the top cover 54 has adequate room for a viewing window 66 in a central position, between the two columns of slots. A viewing window 66 is helpful to monitor foam removal, plate wear, and other dynamic conditions that might develop during operation of a cell 10.

Cover 54 is secured to housing 12 by dry connectors 40, which are secured by fastening nuts 68 that can be loosened to remove the cover. The dry connectors may be vertical tension rods 40 located outside housing 12 and pressure vessel 28, where the rods interconnect the cover with the stacked elements of the housing 12 and pressure vessel 28. Separate fasteners may secure the top wall 34 and bottom wall 32 of the pressure vessel to the rods 40 in positions that maintain the integrity of the pressure vessel. Seals 74 are used between cover 54 and housing 12, between pressure vessel top wall 34 and housing 12, between top wall 34 and sides of the pressure vessel, and between pressure vessel bottom wall 32 and sides of the pressure vessel.

Rapid maintenance is made possible by the modular design of the reaction chamber 14. The reaction chamber is held in place within the housing 12 by fasteners 39, which may be bolts that extend through the bottom wall 20 and into underlying top wall 34 of the pressure vessel in positions external of side walls 48, 52 of the reaction chamber 14. Due to theft positions, these fasteners 39 are not subject to corrosion or electrolytic action from the electrocoagulation process. Removing fasteners 39 allows the reaction chamber 14 to be readily lifted from the housing 12 and replaced with another. Because the manifold wall 20 is part of the reaction chamber structure, each new chamber 14 comes equipped with a suitable manifold wall 20 and properly positioned inlets 18 for the number and spacing of the electrode plates 16 in the new set. A new, coordinated top cover 54 is needed when the replacement reaction chamber 14 is of a new configuration.

In addition to the invention of cell 10, the liquid feed stream is treated by electrocoagulation according to steps that constitute a novel method. As described above and illustrated in the drawings, the liquid feed stream is treated by, first, pressurizing the stream to above ambient level. The pressurized stream is accumulated in a pressure vessel 28, where it is available for further treatment. Second, the liquid feed stream in pressure vessel 28 is continuously fed into a reaction chamber 14 through a means for restricting pressure loss. The matrix of pressure limiting openings 18 functions in this manner by feeding the liquid stream from the pressure vessel into the reaction chamber. The openings are small enough and few enough in number that the liquid in the pressure vessel is maintained at a pressure above atmospheric. In the reaction chamber, the liquid stream is at atmospheric pressure. The reaction chamber 14 contains a vertically oriented array of spaced apart electrode plates 16. The matrix of openings 18 are arranged to feed the incoming liquid stream into vertically oriented interplate spaces 22. Third, the array of electrode plates 16 electrolytically processes the liquid stream within the interplate spaces 22 while the continuously fed liquid stream elevates the treated liquid to the top 24 of the reaction chamber 16. Fourth, elevated liquid of the feed stream together with any product foam is further elevated to overflow the top 24 of the reaction chamber and fall into a collection area 37 outside the reaction chamber.

According to a further aspect of the invention, the matrix of pressure limiting openings 18 is configured by sizes and positions to provide uniform upward flows in the reaction chamber 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. An electrolytic apparatus with exchangeable reaction chamber for treating a liquid stream by electrocoagulation, comprising:

a pressure vessel having an inlet port of first known size for receiving a pressurized liquid stream to be treated, said pressure vessel having a peripheral top wall defining an open central outlet window of second known size, for discharging said liquid stream under greater than atmospheric pressure, that is larger than said inlet port;

a housing mounted on the pressure vessel at said peripheral top wall with an inner portion of the peripheral top wall extending between said housing and said open central outlet window, laterally spacing the open central window from the housing;

a modular reaction chamber mounted on the pressure vessel, laterally within the housing, with the interior of said modular reaction chamber defined by a side enclosure and a bottom manifold wall and containing a set of electrode plates;

wherein:

said bottom manifold wall includes a peripheral bottom wall portion extending outward from said side enclosure to the housing, establishing central spacing of the side enclosure within the housing, positioning the interior of the modular reaction chamber over the open central outlet window of the pressure vessel, and establishing a peripheral volume between the housing and the side enclosure;

the bottom manifold wall defines a plural-passage array of openings located between the open central outlet window and the interior of the reaction chamber for delivering the liquid stream from the pressure vessel to the reaction chamber;

the side enclosure includes an opposite pair of side walls configured to support said set of electrode plates, carrying said set of electrode plates in substantially vertical disposition within the reaction chamber at spaced positions with preselected interplate spacing locations, establishing vertical flow paths through the reaction chamber;

said openings of said plural-passage array are aligned to deliver the liquid stream to said preselected interplate spacing locations for treatment by electrocoagulation to produce a stream of treated liquid;

the reaction chamber defines an outlet at the top end thereof for, in use, venting the reaction chamber to atmospheric pressure and discharging said stream of treated liquid from the reaction chamber by overflow into said peripheral volume;

and further comprising:

a releasable fastener, operable when fastened to secure the bottom manifold wall to the peripheral top wall of the pressure vessel, and operable when released to release the modular reaction chamber for removal from the housing, thereby enabling an exchange; and a means for discharging the overflowed stream of treated liquid from the peripheral volume, located at the vertical level of the bottom manifold wall.

2. The electrolytic apparatus of claim 1, wherein:

said plural-passage array of openings in the manifold wall is sized to be pressure limiting, such that the plural-passage array of openings moderates pressure loss from the pressure vessel.

3. The electrolytic apparatus of claim 1, further comprising:

releasable fasteners securing said modular reaction chamber in a predetermined position with respect to said housing, wherein said releasable fasteners are applied to said peripheral bottom wall portion that extends laterally outward from said side enclosure to the housing, connecting the bottom manifold wall into said pressure vessel.

4. The electrolytic apparatus of claim 1, further comprising:

releasable fasteners securing said modular reaction chamber in a predetermined position with respect to said housing, wherein said releasable fasteners are applied to said peripheral bottom wall portion that extends laterally outward from said side enclosure to the housing, connecting the bottom manifold wall to said peripheral top wall of the pressure vessel.

5. The electrolytic apparatus of claim 1, wherein:

said peripheral bottom wall portion extends between said side enclosure and said housing other than at said means for discharging the overflowed stream of treated liquid from the peripheral volume;

at the means for discharging the overflowed stream of treated liquid from the peripheral volume, the peripheral bottom wall portion defines a setback from the housing; and the means for discharging the overflowed stream of treated liquid from the peripheral volume is attached at said setback and extends to outside the housing.

* * * * *